FIG. 1.

Jan. 24, 1961 K. GEBELE 2,969,004
PHOTOGRAPHIC CAMERA
Filed Nov. 17, 1959 5 Sheets-Sheet 2

FIG. 2.

Jan. 24, 1961  K. GEBELE  2,969,004
PHOTOGRAPHIC CAMERA
Filed Nov. 17, 1959  5 Sheets-Sheet 5

FIG. 7.

United States Patent Office 2,969,004
Patented Jan. 24, 1961

2,969,004

PHOTOGRAPHIC CAMERA

Kurt Gebele, Munich, Germany, assignor to Compur-Werk Friedrich Deckel O.H.G., Munich, Germany, a firm of Germany Filed Nov. 17, 1959, Ser. No. 853,648

Claims priority, application Germany Nov. 18, 1958

16 Claims. (Cl. 95—10)

The present invention relates to a photographic camera, and more particularly to setting the exposure value of a still camera. The construction herein described is an improvement over the invention disclosed in the copending patent application of K. Gebele, Serial No. 842,145, filed September 24, 1959, especially the Fig. 3 embodiment thereof.

An object of the invention is the provision of generally improved and more satisfactory exposure value setting mechanism for a photographic camera.

Another object is the provision of exposure value setting mechanism which is relatively rugged and not likely to be damaged by operation under conditions likely to be encountered in actual use.

Yet another object is the provision of new and improved mechanism for automatically setting both the shutter speed and the diaphragm aperture, so that completely automatic setting of the exposure value is achieved.

A further object is the provision of improved mechanism for automatically setting the diaphragm aperture and shutter speed in accordance with an exposure meter, when desired, the mechanism having provision for optionally setting the diaphragm and shutter speed manually rather than automatically.

A still further object of the invention is to provide a compact construction of a coupling between the diaphragm setting mechanism with the exposure time setting mechanism, which can be easily adapted to different types of cameras and shutters.

Another object is to create a simple and dependably operating device which provides the assurance that in the case of manual adjustment of the diaphragm aperture, no undesired impairment of the manual setting process is possible in any case by the elements of the automatic device which are still in operation but inactive.

Still another object of the invention is to limit the number of connecting and attachment parts between the individual groups of structural parts to a minimum, to decrease the cost of manufacture and to simplify the assembly of the individual groups in the camera.

These and other desirable objects may be attained in the manner disclosed as an illustrative embodiment of the invention in the following description and in the accompanying drawings forming a part hereof, in which.

The same reference numerals throughout the several views indicate the same parts.

The exposure value setting mechanism according to the invention is applied to a camera having an objective shutter and a built-in exposure meter, the camera otherwise being of any suitable known type and manner of operation. The shutter contains the usual shutter speed control cam ring 20, rotatable about the optical axis and bearing on a shutter housing in the usual manner and therefore not here shown. The control ring 20 is rotatable in the conventional manner for adjusting the timing between the opening and closing of the shutter blades, not here shown. The shutter blade operating mechanism may, for example, take the form disclosed in British Patent 769,086 of Deckel, published February 27, 1957, or the closely similar form disclosed in United States Patents 2,900,885 and 2,900,886, of Gebele, issued August 25, 1959. As customary in a shutter of this type or style, the shutter is usually cocked or tensioned by a shaft which is connected to the film winding or film transport mechanism in the camera body, so that the shutter is tensioned automatically and simultaneously when the film is advanced. The tensioning shaft is indicated fragmentarily at 30 in Fig. 1 of the present drawings and corresponds in function to the shaft 14 in said British patent and the second mentioned United States patent, and the shaft 20 in the first mentioned United States patent. This tensioning shaft 30, which lies parallel to the optical axis, is fixed to a tensioning disk 32 (corresponding to the tensioning disk 16 in the British patent) which serves to tension or cock the master member or drive member of the shutter mechanism, and the shaft also carries a pinion 30' serving the function of the teeth 90 in the British patent, meshing with the teeth of the control ring 80 (corresponding to the control ring 76 in the British patent) to move the control ring to its tensioned position when the shaft 30 is rotated.

Figure 1:
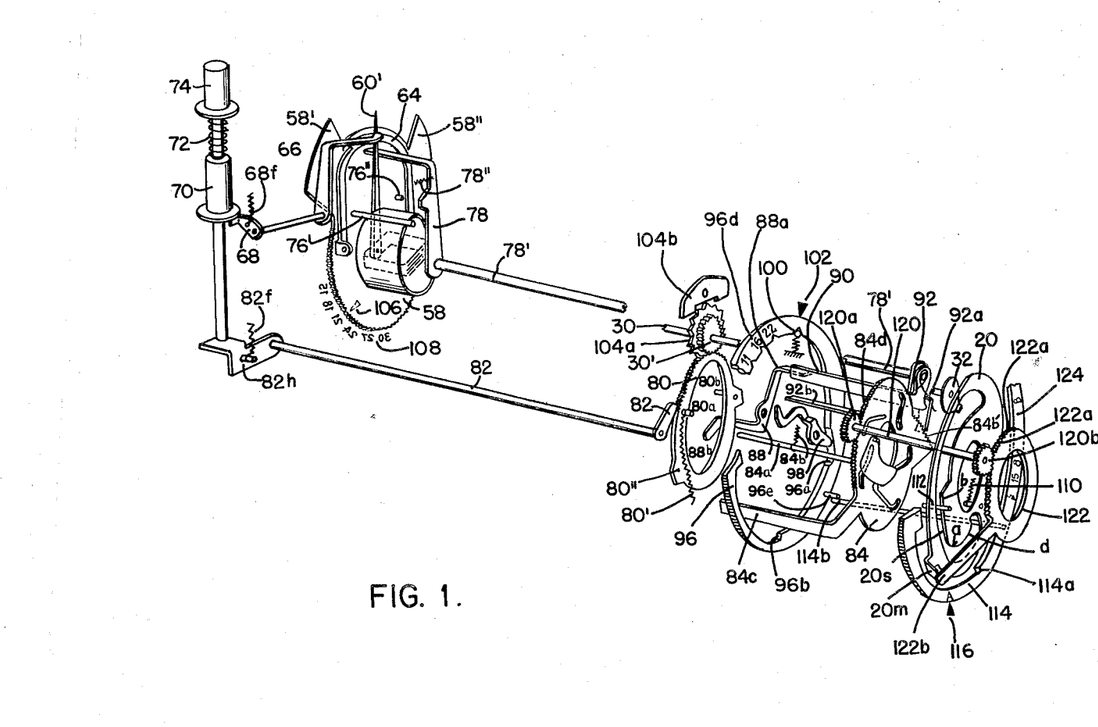
Fig. 1 is a schematic perspective view of the essential drive members of a first embodiment of the invention, the mounting of these elements on the objective shutter and in the camera having been omitted for the sake of clarity.

The camera includes a built-in photoelectric exposure meter mounted on a supporting plate 58 rotatable in the camera body, the measuring mechanism 60 of the meter being operatively coupled in any suitable manner with a photocell, not here shown. By turning the entire supporting plate 58 on which the measuring mechanism 60 is mounted, the entire measuring mechanism can be turned bodily, so that its pointer 60' can be brought into any given angular position with respect to the camera. This bodily turning of the measuring mechanism of the meter, by turning the supporting plate 58, may serve to introduce the variable factor of film speed into the mechanism. For this purpose, a suitable part of the mounting plate 58 projects from the camera body so as to be manually accessible to the operator, and it is turned to set it to any desirable film speed value, by bringing a reference mark 106 on the plate 58 opposite the desired graduation of the film speed scale 108 marked conveniently on the rear wall of the camera body or on a stationary portion visible through a window at the rear of the camera body.

Mounted on the supporting plate 58 is a stirrup-like pivoted clamping member 64 which, when actuated by a swinging arm 66, presses against the forward face of the pointer 60' and clamps it fast against the stationary plate 58 located just to the rear of the pointer. The movement of the clamping arm 66 is effected by the camera release number 74 in the form of a plunger suitably mounted on the camera body to be depressed by a finger of the operator when it is desired to make an exposure. When the plunger 74 is depressed, this compresses a spring 72 which presses on a slidable sleeve 70, thereby moving the arm or link 68 connected to the swinging arm 66, to cause the swinging arm to clamp the pointer 60' in a stationary position so long as the downward pressure on the plunger 74 is continued. When the plunger is released to move upwardly again, a spring 68f connected to the link 68 moves the sleeve 70 upwardly and moves the arm 66 so that the pointer 60' is no longer clamped.

On the supporting plate 58 there are two stop pins 76' and 76" which limit the range of swinging movement of the pointer 60'. The stop pin 76' serves also as a stop for a feeler member 78 which is fixed to a shaft 78' and cooperates with the pointer 60' of the exposure meter. A spring 78" tends to turn the parts 78, 78' in a counterclockwise direction and to hold them in the extreme or limit position determined by the pin 76'.

It has already been mentioned that the cocking or tensioning shaft 30 carries a pinion 30' which meshes with gear teeth on the control ring 80. The ring 80 is acted upon by a spring 80' tending to turn the ring 80 in a counterclockwise direction to its rest or run-down position. A locking pawl 82 is operatively connected to the release plunger 74 and serves to drop behind a notch 80" on the ring 80, to hold the ring in its cocked or tensioned position until the release plunger is depressed, whereupon the locking pawl 82 is released. The pawl 82 may conveniently be fixed to the forward end of a shaft 82' which extends axially (i.e., parallel to the optical axis of the shutter and diaphragm assembly) rearwardly to the vicinity of the release plunger 74 and has fixed to its rear end a lever 82h which underlies the plunger 74 so that depression of the plunger will turn the shaft 82' in a counterclockwise direction, against the force of the restoring spring 82f, to release the latch 82.

Another projection 80a on the ring 80 serves, when the ring is turned in a clockwise direction, to engage an axially extending pin 84a fixed to a diaphragm control ring 84 which is rotatable about the optical axis as a center and which has the usual control slots for actuating the diaphragm leaves 86 which collectively make up an iris diaphragm. A spring 84b acting on the pin 84a tends to turn the diaphragm control ring 84 in a counterclockwise direction, to the position of minimum diaphragm aperture.

The ring 80 also has a driving pin 80b so positioned that when the ring 80 is turned in a clockwise direction from its rest or run-down position, this pin will engage an arm 88b on a swinging lever 88 mounted on a stationary pivot, and turn this lever in a counterclockwise direction on its pivot, so that its other arm 88a will push against the arm 90a of a swinging lever 90 fixed to the shaft 78' of the feeler member 78, the pressure being applied in a manner to turn this shaft 78' clockwise, by the clockwise rotation of the ring 80 and the consequent counterclockwise rotation of the lever 88. Right alongside of the lever 90, there is a locking pawl 92 rotatable on the shaft 78' and having a lug 92a constituting a locking tooth. Under the action of a coiled spring surrounding the end of the shaft 78', the parts 90 and 92 are held in coupling engagement, with the tooth 92a resting against one edge of the locking lever 90. The locking tooth 92a, depending on the position to which it is moved by rotation of the shaft 78', lies in the path of one or another of the stepped-shape notches or abutments 84b' provided on the periphery of the diaphragm control ring 84.

In an externally accessible position on the periphery of the shutter housing, there is a rotatable ring 96 having on its inner edge a cam surface 96a and a radial abutment or stop projection 96b. The cam surface 96a cooperates with one arm of a double-armed lever 98 which is turnable on a fixed pivot, while the other arm of this lever is swingable into the path of movement of the arm 92b of the locking pawl 92. The shoulder or stop projection 96b on the ring 96 extends, in certain adjusted positions of the ring, into the path of an arm 84c on the diaphragm control ring 84.

The ring 96 is frictionally held in any given position in which it has been set by means of a spring loaded detent ball 100 engageable in any one of a series of notches in the inner edge of the ring successively brought opposite the ball 100 by rotation of the ring 96. The ring 96 has on its periphery so as to be readable by the operator, a diaphragm aperture scale 96d of conventional form which cooperates with a stationary index mark 102.

This ring 96 serves as a switching member or controlling member to determine whether the diaphragm aperture is to be set automatically or manually, and if set manually, to determine at what aperture it is to be set. When the camera is to be used for automatic diaphragm setting, the ring 96 is turned to the position where the detent ball 100 is engaged with the notch beyond the end of the scale 96d. In this automatic position, the cam surface 96a is inactive, so that the arm of the lever 98 is out of the path of the arm 92b of the locking pawl 92 (the lever 98 being swung into this inactive position by a spring, not shown) and at the same time the stop shoulder 96b of the ring 96 lies beyond the range of movement of the arm 84c on the diaphragm control ring 84. Hence these parts do not interfere in any way with the intended motion of the pawl 92, which can move, with the rotation of the shaft 78', to any position determined by the engagement of the feeler 78 with the pointer 60' of the exposure meter. The locking pawl 92 partakes of the movement of the shaft 78' because the mentioned spring tends to keep it in a given position with respect to the lever 90 which is fixed to the shaft 78'.

The operation of the diaphragm aperture setting mechanism will be described before proceeding with the description of the shutter speed setting parts. When the appropriate mechanism on the camera body (e.g., the film feeding or advancing mechanism) is operated to turn the tensioning shaft 30, the control ring 80 is also turned in a clockwise direction, and the portion 80a thereon will engage and carry with it the pin 84a on the diaphragm control ring 84, thereby moving it to its limit position in a diaphragm opening direction to open the diaphragm to maximum aperture. During this cocking or tensioning motion, the pin 80b on the control ring 80 also engages the arm 88b of the lever 88 and swings the latter in a counterclockwise direction so as to engage the portion 90a of the lever 90 and swing it and the shaft 78' clockwise. This clockwise movement of the lever 90 causes corresponding clockwise swinging of the stop pawl 92 until it comes to rest on the base circle of the diaphragm control ring 84. The clockwise turning of the arm 90 and shaft 78' also causes clockwise swinging of the feeler member 78 to its starting or initial position, ready to perform a feeling operation on the pointer 60' of the light measuring instrument.

Thus when cocking or tensioning the shutter mechanism, the operator need merely see to it that the proper film speed is set by rotation of the mounting plate 58 to bring the mark 106 opposite the selected film speed on the scale 108. The bodily rotation of the mounting plate 58 varies the position of the measuring instrument in accordance with the selected film speed. Then after the measurement of the light has been effected by the exposure meter in known manner, the pointer 60' of the exposure meter assumes a corresponding deflected position.

The operator now depresses the release plunger 74. At the start of the downward movement of the plunger, the pointer 60' will be clamped stationary in the position which it had reached at that time. Then, upon further downward movement of the plunger, the pawl or latch 82 will be released, allowing the spring 80′ to turn the control ring 80 in a counterclockwise direction. The control ring now starts to run down toward its rest position, this return motion being slowed down by suitable retarding mechanism such as the starwheel 104a fixed to the shaft 30, engaged by a vibrating pad or anchor 104b. During this running down and return movement of the control ring 80, the parts 80a and 80b respectively release the parts 84a and 88b so that the spring 78″ is able to move the feeler 78 and the shaft 78′ until the feeler comes into contact with the clamped pointer 60′ of the measuring instrument. This rotation of the shaft 78′ moves the tooth 92a to a position to cooperate with the proper one of the stepped abutments 84b′ corresponding to the diaphragm aperture to be set. Simultaneously the release of the arm 84a by the portion 80a of the control ring, allows the spring 84b to turn the diaphragm ring 84 in a counterclockwise direction until further counterclockwise movement is stopped by engagement of one of the steps 84b′ with the tooth 92a, whereupon the further rotation of the ring 84 in a diaphragm closing direction is stopped, and the diaphragm is set to the proper aperture.

If it is desired to set the diaphragm aperture manually rather than automatically, the switch ring 96 is moved in a clockwise direction and is set to any desired diaphragm aperture, using the diaphragm aperture scale 96d in conjunction with the reference mark 102. When this ring 96 is set to a selected diaphragm aperture position, the stop shoulder 96b engages the arm 84c of the diaphragm control ring 84 and holds the latter, upon running down from an extreme tensioned position, in the desired diaphragm aperture position. The movement of the ring 96 away from the automatic position also causes the cam surface 96a thereon to swing the latching lever 98 in a clockwise direction on its pivot, so that the other arm thereof engages the arm 92b on the locking tooth 92a, and swings this tooth against the force of a spring to keep the tooth out of the path of the steps 84b′, although still allowing the shaft 78′ and the lever 90 to turn. In other words, the lever 98 serves to break or render ineffective the resilient coupling between the stop tooth 92a and the lever 90. The feeler 78, shaft 78′, and lever 90 still carry out their same normal movements, just as in the case of automatic setting, but these movements do not cause the locking tooth 92a to determine the position of the diaphragm control ring 84.

In accordance with the invention, completely automatic setting of the shutter speed as well as the diaphragm aperture may be effected. In this fully automatic form of the invention, the automatic diaphragm mechanism is so connected with the shutter speed setting device that a given time of exposure or shutter speed is normally associated with a given diaphragm aperture. For example, for an exposure value of 18, a shutter speed of 1/500 of a second may be associated with a diaphragm aperture of f:22, and for lower exposure values there are progressively slower shutter speeds and progressively larger diaphragm apertures, until there is reached a shutter speed of 1/30 of a second and a diaphragm aperture of f:2.8 for an exposure value of 8.

The shutter speed control ring 20 is rotatable about the optical axis and provided with a spring 110 which tends to turn it in a counterclockwise direction. The shutter speed control pin of the mechanism is indicated diagrammatically at 112, and is in sliding engagement with the speed control cam 20s of the timing slot. As well understood in the art, the radial position of this pin 112 with respect to the optical axis of the camera determines the speed at which the exposure is made.

The speed control cam 20s has a portion a which, when opposite the pin 112, controls the shutter action to make an exposure of the longest duration which can be set automatically by the exposure setting mechanism of the present invention, in this example, 1/30 of a second. From this point a the speed control cam extends circumferentially in a clockwise direction and with a radial rise to the point b, which positions the pin 112 to determine the shortest automatically timed exposure, for example, 1/500 of a second. In a counterclockwise direction from the point a, there is a wider part c of the cam, for controlling a "bulb" exposure, that is, an exposure which is timed manually rather than by the internal mechanism of the shutter. In accordance with the invention, there is between the point a and the region c another region d for manually setting shutter speeds of longer duration which can still be automatically timed by the internal mechanism of the shutter but which are outside the range of shutter speeds which can be automatically set by the exposure setting mechanism, these manually set but automatically timed speeds being, for example, 1/15, 1/8, 1/2, and 1 second.

Further in accordance with the invention, the diaphragm control ring 84 and the speed control ring 20 are coupled together for joint rotation to automatically set both the diaphragm aperture and the shutter speed, the coupling with the speed control ring 20 being releasable so that the larger shutter speeds may be set manually and so that a "bulb" setting may be made. To this end, an axially extending shaft 120 is provided having a pinion 120a at one end in meshing engagement with a toothing 84d on a portion of the periphery of the diaphragm control ring 84. At its other end, the shaft 120 bears another pinion 120b which is in meshing engagement with a toothing 122a on a portion of the periphery of a driving ring 122. The driving ring 122 preferably bears rotatably on the front lens tube of the shutter housing not here shown but corresponding, for example, to the front lens tube shown in Fig. 2 of the aforementioned copending patent application Serial No. 842,145. The shaft 120 extends parallel to the optical axis and is desirably supported for rotation in a suitable bushing mounted in the shutter housing, not here shown, passing through the timing slot in the speed control ring 20 to be coupled with the driving ring 122 located forwardly thereof. The shaft 120 thus does not take up any additional space within the shutter for the transmission of the motion. There are furthermore required merely small openings or apertures in the shutter housing or in the lens cover in order to create unimpeded passage of the shaft. The stability of the housing parts is considerably increased in this way. The housing openings can be developed simultaneously as support openings, which constitute an advantageous simplification in manufacture. The two pinions 120a and 120b preferably are identical, having the same pitch circle diameter, the same tooth shape and possibly the same tooth width. In this way, a further simplification is attained.

The shutter speed control ring 20, as has been mentioned, is urged in a counterclockwise direction by the spring 110, which also urges a forwardly turned projection 20m of the speed control ring 20 against a radial arm 122b of the driving ring 122. During the automatic portion of the operation of the shutter, the shaft 120 and the driving ring 122 serve to transmit the rotation of the diaphragm control ring 84 to the speed control ring 20 to rotate the speed control ring 20 by a like amount in the same direction. The exposure time is adjusted progressively shorter and shorter as the diaphragm aperture becomes smaller and smaller.

When this shutter is cocked or tensioned, the control ring 80 is turned in a clockwise direction, which causes corresponding clockwise turning of the diaphragm aperture control ring 84 to maximum aperture position. At the same time, the rotation of the diaphragm control ring 84 is transmitted through the shaft 120 and the driving ring 122 to the speed control ring 20, thus causing corresponding clockwise turning of the shutter speed control ring 20 to the slowest of the automatically timed exposures. Upon actuating the release plunger 74, the diaphragm aperture control ring 84 runs down in the manner previously described until the feeler 78 causes the locking tooth 92a to be positioned to engage the appropriate step 84b' of the ring 84, stopping the counterclockwise rotation of the ring 84 at the appropriate point to set the appropriate diaphragm aperture. At the same time, due to the coupling connection, the speed control ring 20 runs down under the action of the spring 110 to make the exposure time progressively shorter as the diaphragm aperture becomes smaller. When this setting movement is completed, the final part of the counterclockwise rotation of the control ring 80 serves to release the master member or main drive member of the shutter in known manner so that the shutter blades are opened and closed to make the exposure at the speed determined by the position of the control ring 20.

The invention provides for the disconnection of the shutter speed from the diaphragm aperture setting, when desired, so that the speed control ring 20 may be set manually to a position independent of the diaphragm aperture control ring 84. For this purpose, another switching ring 114 is provided near the front of the shutter housing to be accessible for manual actuation from the outside. The switching ring 114 has a switching shoulder or abutment 114a, and also a driving pin 114b fixed to the ring 114 and extending axially rearwardly therefrom, parallel to the optical axis. In the automatic position of the switching ring 114, indicated by a symbol "A" placed opposite a stationary mark 116, the driving pin 114b engages a forwardly extending pin 96e of the switching ring 96. A suitable catch device or detent, like the spring pressed ball 100, holds the ring 114 releasably in any position in which it is set.

The speed switching ring 114 bears on its periphery a circumferentially graduated shutter speed scale 124 which is restricted in range to only those shutter speeds which may be set manually, that is, the shutter speeds previously mentioned larger than the largest automatically set speed, in this example, 1/30 of a second. The scale 124 also includes at its lower end a conventional flashlight symbol consisting of a schematic representation of a stroke of lightning, corresponding in this example to a speed of 1/30 of a second, which speed is commonly used when taking flashlight pictures. At the high end of the scale 124, there is a "B" designation for the bulb setting when the shutter speed is timed manually.

The scale 124 cooperates with the stationary mark 116. With the switching ring 114 turned clockwise from the position illustrated in Fig. 1, the shoulder or abutment 114a engages the arm 20m on the speed control ring 20 and displaces it clockwise to such an extent as to bring the point a of the speed cam 20s, or the regions d or c, opposite the shutter speed control pin 112, to set the shutter in accordance with the particular designation of the scale 124 which is set opposite the stationary mark 116. This clockwise adjustment of the shutter speed control ring 20 not only disengages the connection between the rings 20 and 84 (by moving the arm 20m away from the radial arm 122b of the driving ring 122) but also disengages the driver pin 114b on the ring 20 clockwise away from the pin 96e of the switching ring 96. Therefore it is now possible to move the switching ring 96 in a clockwise direction to any desired diaphragm aperture setting, without thereby affecting the position of the shutter speed control ring 20.

The manual movement of the switching ring 96 in a clockwise direction from the automatic position indicated, serves in the same manner described previously, to cause the cam 96a to swing the locking lever 98 to render the automatic diaphragm setting mechanism ineffective, and to set the diaphragm aperture manually to any desired size, which can be selected by means of the diaphragm aperture scale 96d. Thus with each manual setting of the diaphragm aperture, there is now a shutter speed setting to the lightning symbol for flash photography, or to one of the longer manually set shutter speeds, or to the bulb setting "B."

When the switching ring 114 is turned back in a counterclockwise direction to the position "A" the pin 114b again comes into engagement with the pin 96e and carries the switching ring 96 back in a counterclockwise direction to its automatic position as shown. Thus the return of the ring 114 to its position for automatic setting of the shutter speed serves simultaneously to return the diaphragm aperture switching ring 96 to its automatic operating position, avoiding any possible error in manipulation.

In a simplification of the first embodiment, the pinion 120b carried by the end of the shaft 120 may engage directly in a toothing on the shutter speed control ring 20 so that the driving ring 122 is eliminated. In this modification, however, manual adjustment of the shutter speed control ring 20 independent of the diaphragm setting is not possible.

Figure 2:
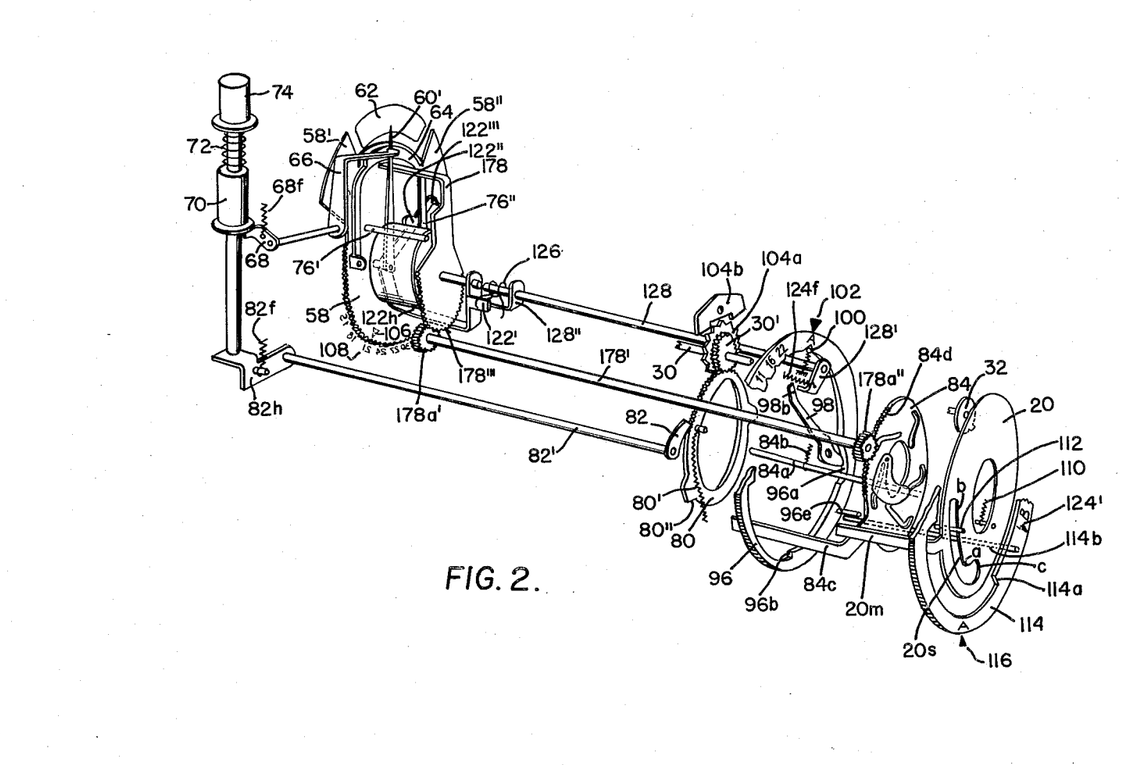
Fig. 2 is a view similar to Fig. 1 of a second embodiment of the invention.

The second embodiment of the invention illustrated in Fig. 2 is designed to simplify the structure to thereby lower manufacturing costs, while yet having a dependable operation which sees to it that in the case of a manual setting of the diaphragm, undesired impairment of manual adjustment is not possible by the parts of the automatic mechanism which are still in operation but inactive. Corresponding elements as in the Fig. 1 embodiment have been given corresponding numerals, various of the numerals having been omitted for the sake of clarity. In Fig. 2, the shape of the speed cam 20s, the scale 124' on the shifting ring 114, and the nature of the coupling between the shutter speed control ring 20 and the diaphragm control ring 84, all take the form illustrated and described with regard to the Fig. 3 embodiment of the aforementioned patent application Serial No. 842,145, of which the present construction is an improvement. The speed control cam 20s in this form has only the automatically timed region between the points a and b, and a manually timed "bulb" setting region c. For the example given, the shutter may be set for automatically timed speeds of between 1/500 of a second and 1/30 of a second, the larger shutter speed region d described in regard to Fig. 1 having been omitted. The scale 124' therefore now has only the lightning bolt representation for flash photography, and the "B" designation for manually timed bulb settings. The coupling between the rings 20 and 84 is provided solely by the rearwardly extending arm 20m which is urged by the spring 110 against the arm 84c of the ring 80. Thus the speed control ring 20 cannot turn any farther in a counterclockwise direction than is permitted by the position of the diaphragm aperture control ring 84. When the diaphragm aperture control ring 84 is completely run down to its relaxed or rest position, which is the position for the smallest diaphragm aperture, the portion b of the cam 20s will be opposite the pin 112, setting the shutter for the shortest exposure. Rotation of the diaphragm control ring 84 in a clockwise direction (by action of the control ring 80, as described previously) to its fully tensioned or largest diaphragm aperture position, will serve, through the arm 20m, to turn the shutter speed control ring 20 to a position where the cam portion a is opposite the pin 112, setting the shutter for the longest internally timed exposure. At any intermediate position of the diaphragm aperture control ring 84, there will be a corresponding intermediate position of the cam 20s acting on the pin 112, to set the shutter for an intermediate speed of exposure.

The exposure meter in this embodiment has a diaphragm aperture scale arranged on a stationary and preferably transparent support 62, located so as to be visible through a window at the rear of the camera, for indicating the position of the pointer 60'. The supporting plate 58 has two side wings 58' and 58" in a position to swing in front of and cover part of the diaphragm scale, when the supporting plate 58 is swung a substantial angle one way or the other from its central position.

As a feeler member cooperating with the measuring pointer 60', there is now used a stop lever 178 having a forwardly extending arm lying in the path of movement of the pointer 60' and also having a lower circular portion provided with a toothing 178'''. The toothing 178''' is in meshing engagement with a pinion 178a' fixed to one end of an axially extending shaft 178'. This shaft bears at its other end another pinion 178a'' which engages a toothing 84d on a portion of the periphery of the diaphragm control ring 84. As before, the shutter is tensioned by rotating the tensioning shaft 30 so that its pinion 30' meshes with the teeth on the periphery of the control ring 80 to rotate the ring 80 in a clockwise direction until latched in a tensioned position by the pawl 82 secured to a shaft 82' operatively connected to the shutter release plunger 74. During the tensioning operation, the pin 84a of the diaphragm aperture control ring 84 is engaged by a projection on the control ring 80 to likewise move the ring 84, and also the shutter speed control ring 20, to their limit positions with the diaphragm leaves 86 opened to maximum diaphragm aperture, and the ring 20 placed for the corresponding shutter speed. During this tensioning, the toothing 84d on the ring 84 rotates the pinion 178a' to result in a corresponding rotation of the stop lever 178 to its extreme limiting position.

Upon depressing the shutter release plunger 74, the clamping arm 66 engages the stirrup-like clamping member 64 to clamp the pointer 60' against the supporting plate 58 in its indicated position. Depressing the plunger 74 also releases the engagement of the latching pawl 82 with the control ring 80 so that the ring 80 begins to run down in a counterclockwise direction, releasing the pin 84a so that the diaphragm control ring 84 likewise begins to run down in a counterclockwise direction. Running down of the ring 84 is stopped by the engagement of the stop lever 178 with the pointer 60', at which time the speed control ring 20 has reached its corresponding position so that continued running down of the control ring 80 may operate the master member, not here shown, to open and close the shutter blades to make an exposure. The entire course of the functioning of the automatic diaphragm mechanism, including the running down of the shutter, takes place, even with the longest exposure time of 1/30 of a second, within a period of time which is shorter than the period of time necessary to actuate and free the release plunger 74. Thus, the clamping of the pointer 60' can in no manner be eliminated by premature freeing of the release plunger 74 before the diaphragm and shutter speed automatic mechanism has run down. Moreover, not here shown, a lock may be provided if desired which prevents the loosening of the clamping of the pointer 60', which lock is released only after the running down of the automatic mechanism by a member which is moved thereby.

Shift rings 96 and 114 are provided for disconnecting the automatic diaphragm mechanism to make possible manual adjustment of the diaphragm aperture, and also manual adjustment of the shutter speed control ring 20 to a position for flash photography or to a "bulb" setting. The present shift rings are similar to those previously described with regard to Fig. 1. The diaphragm shift ring 96 has the cam 96a which cooperates with the lever 98. The lever arm 98b in this embodiment is engageable with an arm 128' firmly seated on a shaft 128 supported in the camera in a manner not here shown parallel to the optical axis. This shaft 128 has near its other end an additional arm 128'' which cooperates with a lug 122' of a double armed swing-out lever 122h. The lever 122h is pivoted on the shaft of the measuring pointer 60', and the stop lever 178 is in turn pivoted on the lever 122h. The other arm 122'' of the swing-out lever 122h lies behind the pointer 60' and rests normally against the stop pin 76'' with its forward bent lug 122''' outside the path of movement of the measurement pointer 60'. This rest position against the stop pin 76'' is achieved by a spring 124f tending to turn the arm 128'' and the shaft 128 in a clockwise direction, thereby engaging the arm 128'' with the lug 122', this engagement being assisted by a spring 126.

When the shift ring 96 is moved in a clockwise direction out of the automatic position shown, the automatic diaphragm mechanism is disconnected to permit manual adjustment of the diaphragm. The cam 96a rotates the lever 98 in a clockwise direction to engage its arm 98b with the arm 128' to swing this arm and the shaft 128 in a counterclockwise direction against the force of the spring 124f. Counterclockwise rotation of the arm 128'' swings the lever 122h to move its arm 122'' in a counterclockwise direction, carrying along with it the pointer 60'. In its end position, the arm 122'' lies against the other stop pin 76' and the pointer 60' is outside the measurement range of the exposure meter and the swinging range of the stop lever 178.

If upon shifting the shift ring 96 during manual setting of the diaphragm, the release plunger 74 should at the same time unintentionally be depressed to such an extent that the device for the clamping of the pointer 60' enters into operation, the arm 122'' pivots only until it engages the clamped pointer 60'. Thereafter the coupling engagement of the lug 122' and arm 128'' produced by the spring 126 is released with simultaneous tensioning of this spring, so that the arm 122'' is not moved farther in a counterclockwise direction. After letting go of the release plunger 74, the clamping of the pointer 60' is released, so that the engagement of the lug 122' and arm 128'' is restored under the action of the tensioned spring 126. The swing-out lever 122h is thereby moved further in a counterclockwise direction carrying along the pointer 60' until it is out of the measurement range of the exposure meter abutting the other stop pin 76'. The stop lever 178 and the diaphragm control ring 84 may now move unimpeded during the return from the extreme limiting position, into a position which is preselected manually by the striking of the diaphragm control ring arm 84c on the stop 96b of the shift ring 96.

The operation of the embodiment of Fig. 2 is thought to be clear when considered in connection with the operation of the corresponding parts as described with regard to Fig. 1.

Figure 3:
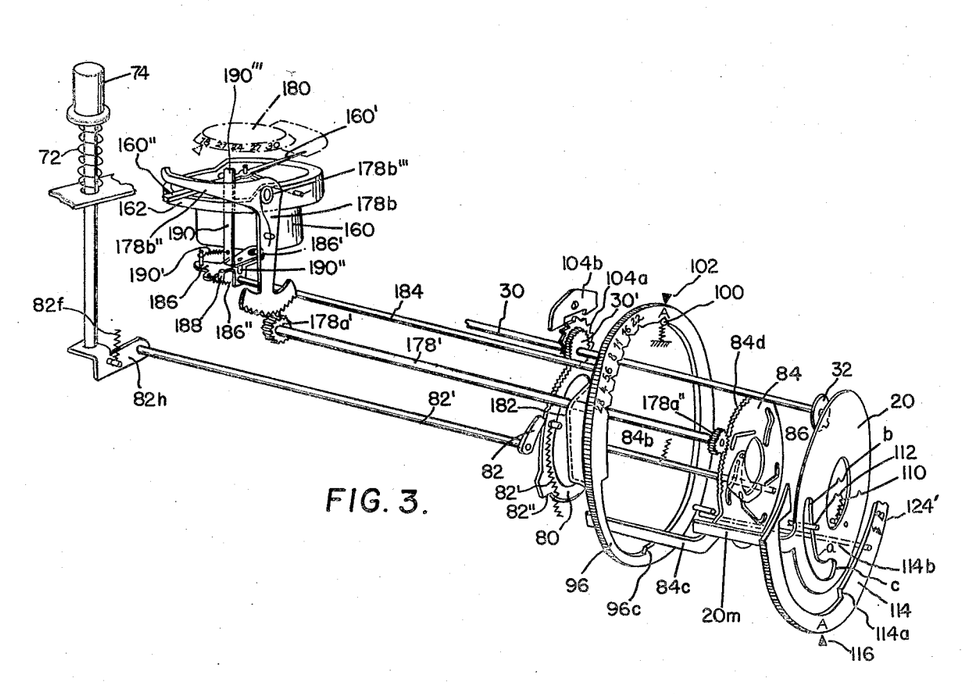
Fig. 3 is a view similar to Fig. 2 showing a third embodiment of the invention employing a different type of exposure meter from that shown in Fig. 2, various parts having been omitted for the sake of clarity.

The third embodiment as illustrated in Fig. 3 is actually a modification of the structure of Fig. 2 corresponding in principle thereto. This differs from the second embodiment in using a different type of exposure meter feeling. The measurement instrument 160 used here has a double armed pointer 160' which pivots in a horizontal plane. The end 160'' of the pointer slides along a stationary clamping jaw 162 which may be finely notched radially. A stop lever 178b turns on a fixed pivot 178b''' and has a toothed end in meshing engagement with a pinion 178a' fixed to one end of an axially extending shaft 178'. The stop lever 178b has an arcuate clamping arm 178b' which lies above the clamping jaw 162 and has a rising stop surface 178b'' that is, a cam-like rise in a direction parallel to the axis on which the pointer 160' rotates. The entire exposure meter may be turned as a unit by means of an adjustmnet knob 180 (indicated merely schematically) to provide an adjustment for taking into consideration, for instance, the film speed. Thus, the knob 180 may have a circumferentially graduated film speed scale cooperating with a stationary mark on the camera housing.

To provide a device actuated by the shift ring 96 for swinging the pointer 160' out of the control range of the exposure meter, i.e., out of the feeling range of the stop lever 178b, there is secured to the shift ring 96 a cam 182 which rises circumferentially and in the direction of the optical axis. Upon the manual setting of a diaphragm aperture by rotating the shift ring 96, the cam 182 slides on a ram pin 184 to displace it axially. The other end of the pin 184 abuts against an intermediate lever 186 pivotally supported at 186' for movement in a substantially horizontal plane. A spring 186'' urges the intermediate lever 186 in a counterclockwise direction to a rest position determined by a stop pin 188. A swing-out lever 190 also pivoted at 186 has a downwardly extending pin 190'' held in engagement with the intermediate lever 186 by a spring 190' secured at its other end to a pin carried by the lever 186.

Upon rotating the shift ring 96 in the range of the diaphragm manual setting, the levers 186 and 190, which are coupled together for movement in a clockwise direction, are pivoted by the pin 184 to such an extent that the pointer end 160'' is swung by the end 190''' of the swing-out lever 190 out of the feeling range of the stop lever 178b. This device acts similarly to the corresponding parts in the embodiment of Fig. 2 if upon shifting the shift ring 96 during manual setting of the diaphragm, the release plunger 74 should at the same time unintentionally be depressed to such an extent that the device for clamping of the pointer 160' enters into operation. In this case, the swing-out lever 190 pivots as before until it strikes the clamped pointer 160'. Thereafter the lever 186 pivots relative to the lever 190 in a clockwise direction, tensioning the spring 190'. Upon the release of the plunger 74 and the clamping of the pointer 160', the tensioned spring 190' pivots the lever 190 farther in a clockwise direction until its stop pin 190'' engages the lever 186. The pointer 160' is thereby swung out of the feeling range of the stop lever 178b in the same manner as before.

When the parts are positioned for automatic setting of the diaphragm aperture, it is seen that the position of the end 160'' of the light meter pointer will determine the extent to which the feeler member 178b' can turn on its pivot 178b''' because of the cam-like rise of the feeler surface 178b''. Thus the position of the pointer of the light meter determines the extent to which the shaft 178' and the diaphragm aperture control ring 84 can turn. Also it is noted that the pressure which the feeler 178b' exerts against the pointer 160'' is a pressure in a direction parallel to the axis of rotation of the pointer, pressing the pointer against the fixed abutment 162 without tending appreciably to turn the pointer on its pivot. Therefore it is not necessary to clamp the pointer before it is engaged by the feeler, as was the case with the embodiments illustrated in Figs. 1 and 2, where the pressure of the feeler is exerted in a direction tending to swing the pointer, rather than in a direction parallel to the axis of the pointer as in Fig. 3.

Corresponding elements in Fig. 3 have been given the same numerals as in Figs. 1 and 2, and the operation of the complete mechanism is similar to that of Fig. 2 and need not be further explained.

In the Fig. 3 and Fig. 2 constructions, there extend between the objective shutter and the exposure meter and the camera several connections formed primarily by the shafts 30, 178', 82', 123, and 184, respectively. Considerable simplification of a structural nature results in the construction of a fourth embodiment of the invention illustrated in Fig. 4. Corresponding elements in Fig. 4 as those in Figs. 1, 2, and 3 have been given the same numerals, and have a similar structure and operation. The exposure meter in this embodiment is like the one described in connection with Fig. 2. The shaft 178'' which is supported parallel to the optical axis here serves as a member of the device for the swinging out of the measurement pointer 60', and also as a member of the dynamic chain coupling the stop lever 178 with the diaphragm control ring 84. The present stop lever 178 therefore operates both for the feeling and for the swinging of the measurement pointer 60' out of the measurement range. On the forward end of the shaft 178'' is fixed a pinion 178k having an axially protruding coupling claw 178k'. A corresponding coupling claw 278k' is fixed to the rear end of a connecting shaft 278 extending in an axial direction and having at its other end a pinion 178a'' in meshing engagement with the teeth 84d on a portion of the periphery of the diaphragm control ring 84. The two coupling claws 178k' and 278k' are urged into engagement by a spring 178f acting on the stop lever 178 and tending to turn the shaft 178'' in a counterclockwise direction, and by the spring 84b tending to turn the diaphragm ring 84 in a counterclockwise direction whereby the shaft 278 is urged in a clockwise direction.

Figures 4, 5, 6:
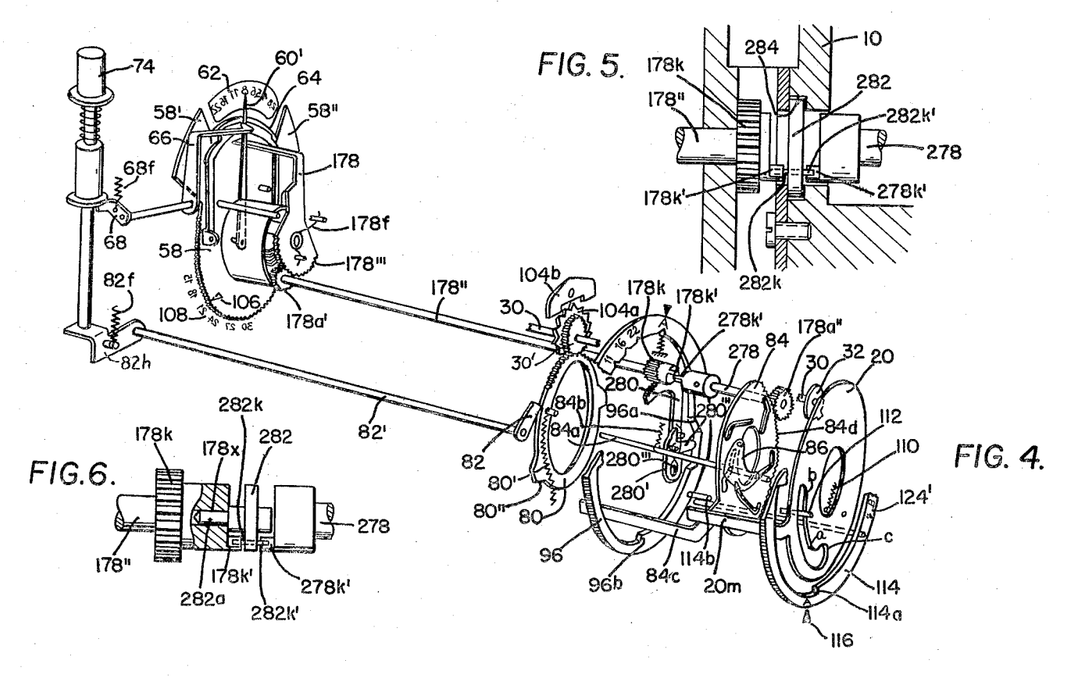
Fig. 4 is a schematic perspective view of the essential drive members of a fourth embodiment of the invention.
Fig. 5 is a fragmentary view partly in elevation and partly in cross section, showing to an enlarged scale a coupling illustrated in Fig. 4, mounted on portions of a shutter housing.
Fig. 6 is a fragmentary view partly in elevation and partly in cross section of a modification of the coupling shown in Fig. 5.

In meshing engagement with the pinion 178k is one lever 280 of a bipartite lever 280, 280'. The other lever 280' is pivoted to the lever 280 and is urged clockwise against a stop pin thereon by a hairspring 280''. By this arrangement, the two levers 280 and 280' are normally held together for clockwise rotation, but may be separated when one lever rotates away from the other. The lever 280' has a projection 280''' which cooperates with the cam 96a on the shift ring 96.

When the shift ring 96 is set for automatic operation of the diaphragm device, the coupled shafts 178'' and 278 rotate as a single shaft to provide the kinetic and functional connection between the stop lever 178 and the diaphragm control ring 84 in the same manner as the single shaft 178' in Fig. 2. Upon rotation of the shafts 178'' and 278 together, the bipartite lever 280, 280' is unimpeded and pivots backward and forward with respect to the shift ring 96. When the shift ring 96 is adjusted in clockwise direction into the region of the manually preselected diaphragm apertures, the cam 96a engages the arm 280''' to swing the lever 280, 280' as a single unit in a counterclockwise direction. The pinion 178k and the shaft 178'' consequently turn in a clockwise direction, and the stop lever 178 engages the measurement pointer 60' to move the pointer out of the measurement range of the exposure meter in a counterclockwise direction until stopped by the pin 76'. The coupling claw 178k' in this connection is rotated with respect to the mating coupling claw 278k' since the diaphragm control ring 84 is stationary during this adjustment of the shift ring 96.

Should the shift ring 96 be turned for manual diaphragm setting while the measurement pointer happens to be clamped fast, as the result of an accidental or erroneous depressing of the shutter release plunger 74, the stop lever 178 at first engages the clamped pointer 60' to prevent further pivoting of the lever 280. The lever 280', however, may continue to pivot in a counterclockwise direction to tension the hairspring 280''. Upon releasing the plunger 74, the pointer 60' is unclamped and the tensioned hairspring 280'' completes the pivoting of the lever 280 to turn the stop lever 178 farther in a counterclockwise direction until the pointer 60' is out of the measurement range of the exposure meter abutting the stop pin 76'. This safety device, it is seen, operates similarly to the corresponding elements in the embodiments of Figs. 2 and 3.

Upon the swinging out of the pointer 60' out of the measurement range in the construction of Fig. 4, the shaft 178'' is rotatable with respect to the connecting shaft 278 only through an angle of about 340 degrees. This construction is satisfactory in the case of certain coupling factors between the stop lever 178 and the diaphragm control ring 84. If, on the other hand, a turning of the shaft 178'' by more than 340 degrees is necessary for the full swinging out of the measurement pointer 60', this can be accomplished by using a rotatable coupling member 282 connected between the shafts 178'' and 278 as shown in Fig. 5. The coupling member 282 is provided by a disk here shown mounted rotatably in a recess 284 of the shutter housing 10, retained between a shoulder on the housing 10 and a plate 10' appropriately fastened to the housing. The member 282 has two oppositely extending axial pins 282k and 282k' secured in alinement to the sides thereof. The coupling claw 278k' on the shaft 278 is held in engagement with the pin 282k' by the previously mentioned spring 84b. The other coupling claw 178k' on the shaft 178" is held in engagement with the other pin 282k by the previously mentioned spring 178f. Upon the disconnecting of the automatic mechanism by the shift ring 96 and the swinging out of the pointer 60' in the manner previously described, the shaft 178" is rotatable approximately 2×340 degrees with respect to the shaft 278.

In Fig. 5, the coupling member 282 is supported in the cylindrical recess 284 of the shutter housing 10. However, the coupling member 282 may also be supported by the shaft 178" as shown in Fig. 6. In this modification, the coupling member 282 has a forward extension 282a rotatably received in an axial bore 178x in the shaft 178". If the installation conditions require, the support of the coupling member 282 may be effected in a similar manner in the other shaft 278 or in the two shafts 178" and 278 at the same time. A plurality of such coupling members 282 may also be provided one behind the other.

The operation of the embodiment of Figs. 4, 5, and 6 is thought to be clear when considered in connection with the operation of the corresponding parts described with regard to the other embodiments.

Figure 7:
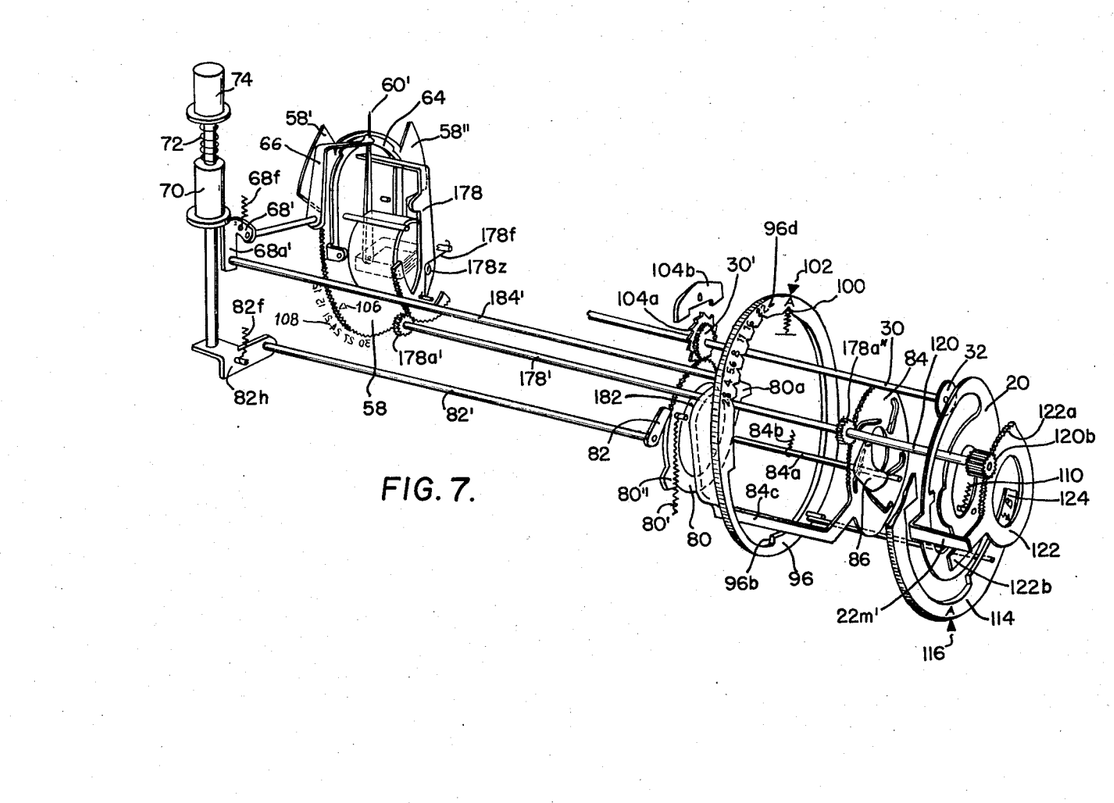
Fig. 7 is a view similar to Fig. 1 of still a fifth embodiment of the invention.

The fifth embodiment of the invention illustrated in Fig. 7 is again designed to obtain a considerable saving of parts as compared to the basic construction disclosed in patent application Serial No. 842,145, while yet providing a simple device which is nevertheless dependable in operation and which sees to it that in the case of the manual setting of the diaphragm, undesired impairment of the manual adjustment is not possible by the parts of the automatic mechanism which are still in operation but inactive. In Fig. 7, corresponding elements as in the previous embodiments have been given the same numerals, and reference should be made to the prior description for a more complete discussion of their structure and operation.

The exposure meter feeling device in the present instance takes a form similar to that in Figs. 2 and 4 wherein the stop lever 178 is pivoted by means of a fixed pivot 178z and has a toothed part meshing with a pinion 178a' secured to one end of an axially extending shaft 178', the other end of the shaft 178' carrying a pinion 178a" in meshing engagement with the diaphragm aperture control ring 84. The end of the stop lever 178 engageable with the measurement pointer 60' is urged in a clockwise direction by a spring 178f acting on the lever. The releasable coupling of the diaphragm aperture control ring 84 and the shutter speed control ring 20 takes basically the form illustrated in Fig. 1 wherein an axially extending shaft 120 has at one end a pinion meshing with the ring 84 and at the other end another pinion 120b' meshing with a driving ring 122 mounted for rotation forwardly of the ring 20. In the present construction, the shafts 178' and 120 may be integral, and the pinion 178a" has the dual function of providing a portion of the coupling with the ring 122. The coupling of the rings 122 and 20 is by means of an unbent radial arm 122b which is engageable with a longer arm 20m'. Thus it can be seen that the tensioning of the control ring 80 by clockwise rotation rotates the rings 84 and 20 by a corresponding amount in the clockwise direction, while the stop lever 178 is pivoted clockwise to its extreme limiting position. With the shift rings 96 and 114 in their automatic positions, depressing the shutter release plunger 74 clamps the measurement pointer 60' and unlatches the control ring 80 for running down movement in a counterclockwise direction. The rings 84 and 20 also run down until stopped by the engagement of the stop lever 178 with the clamped pointer 60'.

The speed shift ring 114 may be set to a manual position for flash photography or to a "B" bulb setting as explained in greater detail with regard to Fig. 1. The diaphragm shift ring 96 may likewise be adjusted clockwise to aline a particular diaphragm aperture value on the scale 96d with the stationary pointer 102. The shift ring 96 bears a circumferentially extending and axially rising cam 182 which cooperates with an axially displaceable ram pin 184'. In the automatic position of the ring 96, the cam 182 is out of engagement with the pin 184'. Upon adjustment of the ring 96 clockwise for the manual setting or diaphragm apertures, the cam 182 displaces the pin 184' rearwardly.

At its other end, the pin 184' abuts or is secured to a downwardly extending arm 68a' of the rocking lever 68' to which the clamping arm 66 is attached. It will be recalled that depressing the shutter release plunger 74 moves the spring 72 axially to displace the sleeve 70 downwardly, and the sleeve 70 pivots the lever 68' to move the clamping arm 66 against the stirrup-like clamping member 64, whereby the measurement pointer 60' is clamped to the supporting plate 58. In the present construction, however, movement of the pin 184' rearwardly by the cam 182 swings the arm 68a' of the lever 68' rearwardly so that the clamping arm 66 cannot move to clamping position. Should the shifting to the manual setting of the ring 96 be made while the pointer 60' happens to be clamped fast, the lever 68' which has been swung out will be moved back against the action of the spring 72 by the pin 184', and the clamping of the pointer 60' will be released.

The operation with a manually set diaphragm aperture is similar to that previously described in the operation of Fig. 1, and in this case depression of the shutter release plunger 74 acts to release the latching pawl 82 from the control ring 80, while the sleeve 70 is prevented from downward movement so that the pointer 60' is not clamped.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a diaphragm having an adjustable aperture and a diaphragm aperture control ring rotatable through a range to various positions for adjusting the diaphragm to different aperture sizes, spring means tending to move said diaphragm control ring to a rest position at one end of its range, means for moving said diaphragm control ring to a tensioned position at the opposite end of its range, an exposure meter having a pointer, means for releasably clamping said pointer at its deflected position and for releasing said diaphragm control ring for running down from said tensioned to said rest position, a feeler engageable with said pointer and coupled to said control ring for movement to a limiting position when said control ring is moved to said tensioned position, said feeler swinging from said limiting position as said control ring runs down until engaging said clamped pointer as a stop and holding said control ring at the corresponding diaphragm aperture position, a switch having a cam, and means engageable by said switch cam for releasing the holding of said diaphragm control ring by said feeler and pointer when said control ring runs down from said tensioned to said rest position, thereby eliminating the function of said pointer as a stop.

2. A construction as defined in claim 1, wherein said switch comprises a ring having a stop surface, an arm on said diaphragm control ring engageable with said stop surface in a running down direction thereof, said switch ring being rotatable to adjust the point at which said control ring arm engages said stop surface to thereby provide a manually adjustable diaphragm aperture setting.

3. A construction as defined in claim 1, wherein said cam is arranged radially and said means engageable thereby comprises a lever rotatable about a fixed pivot, an axially extending shaft, a swing-out lever pivoted concentric to said exposure meter pointer and arranged to be engageable therewith, and means for coupling said shaft with said lever and swing-out pointer so that actuation of said switch engages said lever to rotate said shaft and swing said swing-out lever to engage said pointer and move said pointer out of the range of movement of said feeler.

4. A construction as defined in claim 1, wherein said cam is arranged axially and said means engageable thereby includes an axially displaceable ram pin, a spring-loaded lever having a fixed pivot and having a portion engageable with said exposure meter pointer, one end of said ram pin abutting said lever to swing said portion and pointer engaged thereby out of the range of movement of said feeler when said switch is actuated to cam the other end of said ram pin axially.

5. A construction as defined in claim 1, wherein said cam is arranged axially and said means engageable thereby includes an axially displaceable ram pin, said means for releasably clamping said pointer including a locking lever, one end of said ram pin engaging said lever while the other end rests on said cam, actuation of said switch displacing said ram pin axially to pivot said lever and prevent said pointer from being clamped.

6. A photographic camera comprising a diaphragm having an adjustable aperture and a diaphragm aperture control ring rotatable through a range to various positions for adjusting the diaphragm to different aperture sizes, spring means tending to move said diaphrgam control ring to a rest position at one end of its range, means for moving said diaphragm control ring to a tensioned position at the opposite end of its range, an exposure meter having a pointer, means for releasably clamping said pointer at its deflected position and for releasing said diaphragm control ring for running down from said tensioned to said rest position, a feeler engageable with said pointer and coupled to said control ring for movement to a limiting position when said control ring is moved to said tensioned position, said feeler swinging from said limiting position as said control ring runs down until engaging said clamped pointer as a stop and holding said control ring at the corresponding diaphragm aperture position, a switch having a cam, means engageable by said switch cam for releasing the holding of said diaphragm control ring by said feeler and clamped pointer when said control ring runs down from said tensioned to said rest position, thereby eliminating the function of said pointer as a stop, said last mentioned means comprising a lever rotatable about a fixed pivot, an axially extending shaft arranged to be rotated by said lever, said feeler being coupled to the other end of said shaft and serving additionally to swing said pointer out of the measurement range of said meter when said switch is actuated to engage said cam with said lever, said shaft being extended and coupled with said diaphragm control ring, said shaft further being divided and connected by an over-riding coupling so that a rotation of said shaft produced by actuation of said switch is not transmitted to the shaft extension coupled with said diaphragm control ring.

7. A photographic camera comprising a diaphragm having an adjustable aperture and a diaphragm aperture control ring rotatable through a range to various positions for adjusting the diaphragm to different aperture sizes, spring means tending to move said diaphragm control ring to a rest position at one end of its range, means for moving said diaphragm control ring to a tensioned position at the opposite end of its range, an exposure meter having a pointer, means for releasably clamping said pointer at its deflected position and for releasing said diaphragm control ring for running down from said tensioned to said rest position, a feeler engageable with said pointer and coupled to said control ring for movement to a limiting position when said control ring is moved to said tensioned position, said feeler swinging from said limiting position as said control ring runs down until engaging said clamped pointer as a stop and holding said control ring at the corresponding diaphragm aperture position, a switch having a cam, means engageable by said switch cam for releasing the holding of said diaphragm control ring by said feeler and pointer when said control ring runs down from said tensioned to said rest position, thereby eliminating the function of said pointer as a stop, said last mentioned means including a bipartite member coupled in one direction by a spring, whereby inadvertent clamping of said pointer during actuation of said switching ring results in a separation of said bipartite member against the force of its spring when said feeler strikes said clamped pointer.

8. A photographic camera comprising a diaphragm having an adjustable aperture and a diaphragm aperture control ring rotatable through a range to various positions for adjusting the diaphragm to different aperture sizes, spring means tending to move said diaphragm control ring to a rest position at one end of its range, means for moving said diaphragm control ring to a tensioned position at the opposite end of its range, an exposure meter having a pointer, means for releasably clamping said pointer at its deflected position and for releasing said diaphragm control ring for running down from said tensioned to said rest position, a feeler engageable with said pointer and coupled to said control ring for movement to a limiting position when said control ring is moved to said tensioned position, said feeler swinging from said limiting position as said control ring runs down until engaging said clamped pointer as a stop and holding said control ring at the corresponding diaphragm aperture position, a switch having a cam, means engageable by said switch cam for releasing the holding of said diaphragm aperture control ring by said feeler and pointer when said control ring runs down from said tensioned to said rest position, thereby eliminating the function of said pointer as a stop, a shutter speed control ring, and means for coupling said diaphragm aperture and shutter speed control rings for joint setting movement, said coupling means including a shaft parallel to the optical axis.

9. A construction as defined in claim 8, wherein said coupling means further includes a driving ring rotatably mounted adjacent said shutter speed control ring, a releasable coupling between said driving and shutter speed control rings, spring means for engaging said releasable coupling, gear teeth on the periphery of said driving and diaphragm control rings, and pinions on the ends of said shaft in meshing engagement with said gear teeth.

10. A photographic camera comprising a diaphragm having an adjustable aperture and a diaphragm aperture control ring rotatable through a range to various positions for adjusting the diaphragm to different aperture sizes, spring means tending to move said diaphragm control ring to a rest position at one end of its range, means for moving said diaphragm control ring to a tensioned position at the opposite end of its range, an exposure meter having a pointer normally movable in accordance with variations in illumination conditions, a feeler engageable with said pointer and coupled to said aperture control ring for movement to a limiting position by movement of said aperture control ring to its said tensioned position, said feeler swinging from said limiting position as said aperture control ring runs down until engaging said pointer as a stop and holding said control ring at the corresponding diaphragm aperture position, a switch having a cam, and means engageable by said switch cam for rendering said pointer ineffective as a stop for stopping the running down motion of said diaphragm aperture control ring.

11. A photographic camera comprising a diaphragm having an adjustable aperture and a diaphragm aperture control ring rotatable through a range to various positions for adjusting the diaphragm to different aperture sizes, spring means tending to move said diaphragm control ring to a rest position at one end of its range, means for moving said diaphragm control ring to a tensioned position at the opposite end of its range, an exposure meter having a pointer normally movable in accordance with variations in illumination conditions, a feeler engageable with said pointer and coupled to said aperture control ring for movement to a limiting position by movement of said aperture control ring to its said tensioned position, said feeler swinging from said limiting position as said aperture control ring runs down until engaging said pointer as a stop and holding said control ring at the corresponding diaphragm aperture position, a switch having a cam, and means moved by said switch cam for shifting said pointer to a position ineffective to stop movement of said feeler.

12. A photographic camera comprising a diaphragm having an adjustable aperture and a diaphragm aperture control ring rotatable through a range to various positions for adjusting the diaphragm to different aperture sizes, spring means tending to move said diaphragm control ring to a rest position at one end of its range, means for moving said diaphragm control ring to a tensioned position at the opposite end of its range, an exposure meter having a pointer normally movable in accordance with variations in illumination conditions, a feeler engageable with said pointer and coupled to said aperture control ring for movement to a limiting position by movement of said aperture control ring to its said tensioned position, said feeler swinging from said limiting position as said aperture control ring runs down until engaging said pointer as a stop and holding said control ring at the corresponding diaphragm aperture position, a switching member having a cam thereon, means moved by said cam for shifting said pointer to a position beyond the normal range of operating movement of said feeler, so that the pointer will be ineffective to determine the position at which said control ring stops during a running down movement from its tensioned position toward its rest position, and abutment means on said switching member for stopping said control ring during a running down movement thereof.

13. A construction as defined in claim 12, in which said switching member is in the form of a ring rotatably adjustable selectively to an automatic diaphragm setting position and a plurality of manual diaphragm setting positions, said cam being effective to shift said pointer to said position beyond the normal range of said feeler when said switching member is in any one of its manual setting positions, said abutment means being shifted by movement of said switching member from one of its manual setting positions to another of its manual setting positions to stop said control ring at a different point in its running down movement.

14. A photographic camera comprising a diaphragm aperture control ring and a shutter speed control ring both mounted for rotation about a common axis, spring means tending to turn both of said rings from respective tensioned positions toward respective run-down positions, a driving ring also mounted for rotation about said axis, cooperating abutment portions on said speed control ring and said driving ring for turning said speed control ring toward its tensioned position by rotation of said driving ring in a first direction, said abutment portions being capable of separating from each other so that said driving ring may rotate in a second direction without said speed control ring necessarily turning with it, and connecting means operatively connecting said driving ring to said aperture control ring to turn said driving ring in a direction to cause said abutment portions to move said speed control ring toward its tensioned position upon movement of said aperture control ring toward its tensioned position.

15. A construction as defined in claim 14, further including a light meter pointer, a feeler for engaging said pointer, a series of stepped abutments on said aperture control ring, and a locking tooth operatively connected to said feeler and positioned thereby in a position to engage a selected one of said stepped abutments to stop said aperture control ring at a variable point during rotation thereof from its tensioned position toward its run down position.

16. A construction as defined in claim 14, further including a light meter pointer, a feeler for engaging said pointer, and means controlled by the position of said feeler for stopping movement of said aperture control ring at a variable point during rotation thereof from its tensioned position toward its run down position, said means including gear teeth on said aperture control ring, a pinion meshing with said gear teeth, and a shaft operatively connecting said pinion to said feeler.

References Cited in the file of this patent

UNITED STATES PATENTS

| | | |
|---|---|---|
| 2,148,963 | Rauch | Feb. 28, 1939 |
| 2,868,095 | Gebele | Jan. 13, 1959 |
| 2,887,025 | Rentschler | May 19, 1959 |
| 2,906,166 | Herterich | Sept. 29, 1959 |
| 2,913,969 | Faulhaber | Nov. 24, 1959 |
| 2,923,216 | Greger | Feb. 2, 1960 |